US009320112B2

(12) United States Patent
Tabor

(10) Patent No.: US 9,320,112 B2
(45) Date of Patent: Apr. 19, 2016

(54) CONTROL SYSTEM FOR LIGHTING ASSEMBLY

(71) Applicant: Kent Tabor, Pewaukee, WI (US)

(72) Inventor: Kent Tabor, Pewaukee, WI (US)

( * ) Notice: Subject to any disclaimer, the term of this patent is extended or adjusted under 35 U.S.C. 154(b) by 371 days.

(21) Appl. No.: 13/839,561

(22) Filed: Mar. 15, 2013

(65) Prior Publication Data
US 2013/0257291 A1    Oct. 3, 2013

Related U.S. Application Data

(60) Provisional application No. 61/619,226, filed on Apr. 2, 2012.

(51) Int. Cl.
H05B 37/02    (2006.01)

(52) U.S. Cl.
CPC ........ H05B 37/0218 (2013.01); H05B 37/0209 (2013.01); H05B 37/0227 (2013.01); Y02B 20/44 (2013.01); Y02B 20/46 (2013.01)

(58) Field of Classification Search
USPC ................. 315/130, 152, 154, 159, 294, 297, 315/307–308
See application file for complete search history.

(56) References Cited

U.S. PATENT DOCUMENTS

| | | |
|---|---|---|
| 3,151,854 A | 10/1964 | Felburn |
| 3,154,300 A | 10/1964 | Wenzel |
| 3,251,608 A | 5/1966 | Raidel |
| 3,386,724 A | 6/1968 | Tantlinger et al. |
| 3,971,028 A | 7/1976 | Funk |
| 4,242,614 A | 12/1980 | Vatis et al. |
| 4,368,406 A | 1/1983 | Kruzich et al. |
| 4,538,973 A | 9/1985 | Angott et al. |
| 5,099,193 A | 3/1992 | Moseley et al. |
| 5,160,924 A | 11/1992 | Conil et al. |
| 5,210,467 A | 5/1993 | Nagashima |
| 5,455,487 A | 10/1995 | Mix et al. |
| 5,470,096 A | 11/1995 | Baxter |
| 5,506,715 A | 4/1996 | Zhu |
| 5,596,247 A * | 1/1997 | Martich et al. .................. 315/56 |
| 5,648,656 A | 7/1997 | Begemann et al. |
| 5,661,468 A | 8/1997 | Marcoux |
| 5,689,261 A | 11/1997 | Mehta et al. |
| 5,701,058 A | 12/1997 | Roth |

(Continued)

FOREIGN PATENT DOCUMENTS

WO    WO 2010/116283    3/2010

OTHER PUBLICATIONS

Easydim Versatile Local Light Control; Aug. 2011; 12 pages.

(Continued)

*Primary Examiner* — An Luu
(74) *Attorney, Agent, or Firm* — Michael Best & Friedrich, LLP

(57) ABSTRACT

A lighting system includes a light emitting element operable to emit light at a level between zero and 100 percent, a light level sensor positioned to detect a total level of light, and a motion detector positioned to detect a motion in a predefined space. A controller is coupled to the light emitting element, the light level sensor, and the motion detector and is operable to compare a measured total level of light to a set point and to activate the light emitting element in response to the measured total light level being below the setpoint. The controller is further operable to activate the light emitting element in response to the detection of motion within the space.

14 Claims, 3 Drawing Sheets

(56) References Cited

U.S. PATENT DOCUMENTS

| | | | |
|---|---|---|---|
| 5,921,570 A | 7/1999 | Lie | |
| 5,933,091 A | 8/1999 | McCaslin | |
| 6,114,812 A | 9/2000 | Lee | |
| 6,153,984 A * | 11/2000 | Fishbein et al. | 315/291 |
| 6,163,275 A | 12/2000 | Hartzell | |
| 6,169,377 B1 | 1/2001 | Bryde et al. | |
| 6,174,073 B1 | 1/2001 | Regan et al. | |
| 6,300,727 B1 | 10/2001 | Bryde et al. | |
| 6,340,864 B1 | 1/2002 | Wacyk | |
| 6,348,768 B1 | 2/2002 | Weng | |
| 6,394,630 B1 | 5/2002 | Skidmore et al. | |
| 6,424,660 B2 | 7/2002 | Jacobson, Jr. | |
| 6,630,800 B2 | 10/2003 | Weng | |
| 6,636,005 B2 | 10/2003 | Wacyk et al. | |
| 6,655,817 B2 | 12/2003 | Devlin et al. | |
| 6,667,578 B2 | 12/2003 | Lansing et al. | |
| 6,674,255 B2 | 1/2004 | Schnebly et al. | |
| 6,700,334 B2 | 3/2004 | Weng | |
| 6,703,788 B1 | 3/2004 | Miller et al. | |
| 6,759,966 B1 | 7/2004 | Weng | |
| 6,771,182 B1 | 8/2004 | Loh et al. | |
| 6,771,256 B1 | 8/2004 | Abraham et al. | |
| 6,774,582 B1 | 8/2004 | Kwong et al. | |
| 6,828,733 B1 | 12/2004 | Crenshaw | |
| 6,831,569 B2 | 12/2004 | Wang et al. | |
| 6,912,429 B1 | 6/2005 | Bilger | |
| 7,024,119 B1 | 4/2006 | Mier-Langner et al. | |
| 7,027,736 B1 | 4/2006 | Mier-Langner et al. | |
| 7,111,952 B2 | 9/2006 | Veskovic | |
| 7,148,628 B2 | 12/2006 | McCavit et al. | |
| 7,312,585 B2 | 12/2007 | Wilhelm | |
| 7,355,523 B2 | 4/2008 | Sid | |
| 7,391,297 B2 | 6/2008 | Cash et al. | |
| 7,417,556 B2 | 8/2008 | Ling | |
| 7,463,164 B2 | 12/2008 | Williams et al. | |
| 7,521,872 B2 | 4/2009 | Bruning | |
| 7,573,208 B2 | 8/2009 | Newman, Jr. | |
| 7,597,452 B2 | 10/2009 | Jeng et al. | |
| 7,598,681 B2 | 10/2009 | Lys et al. | |
| 7,603,184 B2 | 10/2009 | Walters et al. | |
| 7,656,098 B2 | 2/2010 | Tseng | |
| 7,659,674 B2 | 2/2010 | Mueller et al. | |
| 7,677,753 B1 | 3/2010 | Wills | |
| 7,764,162 B2 | 7/2010 | Cash et al. | |
| 7,781,713 B2 | 8/2010 | Papamichael et al. | |
| 7,812,543 B2 | 10/2010 | Budike, Jr. | |
| 7,812,549 B2 | 10/2010 | Yuen | |
| 7,839,017 B2 | 11/2010 | Huizenga et al. | |
| 7,843,353 B2 | 11/2010 | Pan et al. | |
| 7,880,394 B2 | 2/2011 | Sibalich et al. | |
| 7,880,638 B2 | 2/2011 | Veskovic et al. | |
| 7,902,759 B2 | 3/2011 | Newman, Jr. | |
| 7,911,359 B2 | 3/2011 | Walters et al. | |
| 7,936,281 B2 | 5/2011 | Cash et al. | |
| 7,938,562 B2 | 5/2011 | Ivey et al. | |
| 7,948,189 B2 * | 5/2011 | Ahmed | 315/291 |
| 7,961,075 B2 | 6/2011 | Kuenzler et al. | |
| 8,009,042 B2 | 8/2011 | Steiner et al. | |
| 8,010,319 B2 | 8/2011 | Walters et al. | |
| 8,604,701 B2 * | 12/2013 | Verfuerth et al. | 315/149 |
| 8,853,965 B2 * | 10/2014 | Bouws et al. | 315/294 |
| 8,866,392 B2 * | 10/2014 | Chen | 315/152 |
| 2003/0111143 A1 | 6/2003 | Wheeler, Jr. | |
| 2003/0209999 A1 | 11/2003 | Hui et al. | |
| 2003/0210167 A1 | 11/2003 | Weng | |
| 2004/0196140 A1 | 10/2004 | Sid | |
| 2004/0201491 A1 | 10/2004 | Weng | |
| 2006/0012317 A1 | 1/2006 | Chiu et al. | |
| 2007/0171028 A1 | 7/2007 | Crookham et al. | |
| 2008/0088435 A1 | 4/2008 | Cash et al. | |
| 2008/0265799 A1 | 10/2008 | Sibert | |
| 2008/0303451 A1 | 12/2008 | Mosebrook et al. | |
| 2008/0304833 A1 | 12/2008 | Zheng | |
| 2009/0058681 A1 | 3/2009 | Johnston et al. | |
| 2010/0066267 A1 | 3/2010 | Meyer | |
| 2010/0141153 A1 | 6/2010 | Recker et al. | |
| 2011/0017014 A1 | 1/2011 | Batdorff | |

OTHER PUBLICATIONS

E-Matic Energy Management Solutions, PMCSS Ceiling Sensor Surface C/W Remote Control; 4 pages.

* cited by examiner

CONTROL SYSTEM FOR LIGHTING ASSEMBLY

RELATED APPLICATIONS

This application claims priority to U.S. Provisional Patent Application No. 61/619,226, filed on Apr. 2, 2012, the entire contents of which are incorporated herein by reference.

BACKGROUND

The present invention relates to a control system for a lighting assembly, and more particularly to an infrared (IR) remote control system for a lighting assembly.

Lighting systems for lighting large facilities, such as warehouses and factories, typically utilize fluorescent or light-emitting diode (LED) lights to illuminate certain portions of space under certain conditions. Control of these lighting systems is important not only tier proper illumination but to minimize energy usage. To that end, environmental sensors, such as motion sensors, are often used to activate lights in only those areas specifically occupied, serving both purposes.

Electronic switches, for example DIP switches, incorporated on a circuit board of a. lighting controller are often used to set lighting function parameters such as the threshold level of motion at which the lights will activate and/or the duration the lights will remain on in the absence of motion. Due to the physical location of the lights and the controller(s) within such facilities, i.e., at or near the ceiling, adjusting the sensors and other lighting parameters is often difficult, time consuming, and carries a degree of safety risk.

SUMMARY

The present invention provides a method of controlling lighting parameters, to include various sensor thresholds for light activation and timing intervals for light deactivation, from a position distant from the lighting controller. A remote control device using infrared (IR) signaling permits a user to quickly and safely communicate with the lighting controller to adjust such parameters. Moreover, the lighting controller also includes an ambient light sensor and a dimmer that work in conjunction to maintain the light intensity of an activated light at a predetermined level.

In one construction, the invention provides a. lighting system that includes a light emitting element operable to emit light at a level between zero and 100 percent, a light level sensor positioned to detect a total level of light, and a motion detector positioned to detect a motion in a predefined space. A controller is coupled to the light emitting element, the light level sensor, and the motion detector and is operable to compare a measured total level of light to a set point and to activate the light emitting element in response to the measured total light level being below the setpoint. The controller is further operable to activate the light emitting element in response to the detection of motion within the space.

In another construction, the invention provides a lighting system that includes a plurality of fluorescent light emitting units arranged to emit light in an area between a level of zero and 100 percent. A light level sensor is positioned to detect a total level of light and transmit a signal indicative of a measured light level and a controller is operable to receive the measured light level and compare the measured light level to a preset desired light level and to adjust the plurality of fluorescent light emitting units in response to that comparison to emit a level of light between zero and 100 percent in order to change the measured light level to substantially match the preset desired light level. A remote control device is operable from a position apart from the controller to change the preset desired light level.

In another construction, the invention provides a method of controlling a light level within a space. The method includes sensing a current light level at a predetermined location, storing a first desired light level in a controller, comparing the sensed light level with the first desired light level, and adjusting the light output of a plurality of fluorescent lights in response to the comparison of the sensed light level to the first desired light level until the sensed light level is about equal to the first desired light level. The method also includes remotely adjusting the desired light level to a second desired light level and adjusting the light output of the plurality of fluorescent lights in response to a comparison of the sensed light level to the second desired light level until the sensed light level is about equal to the second desired light level.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

Figure 1:
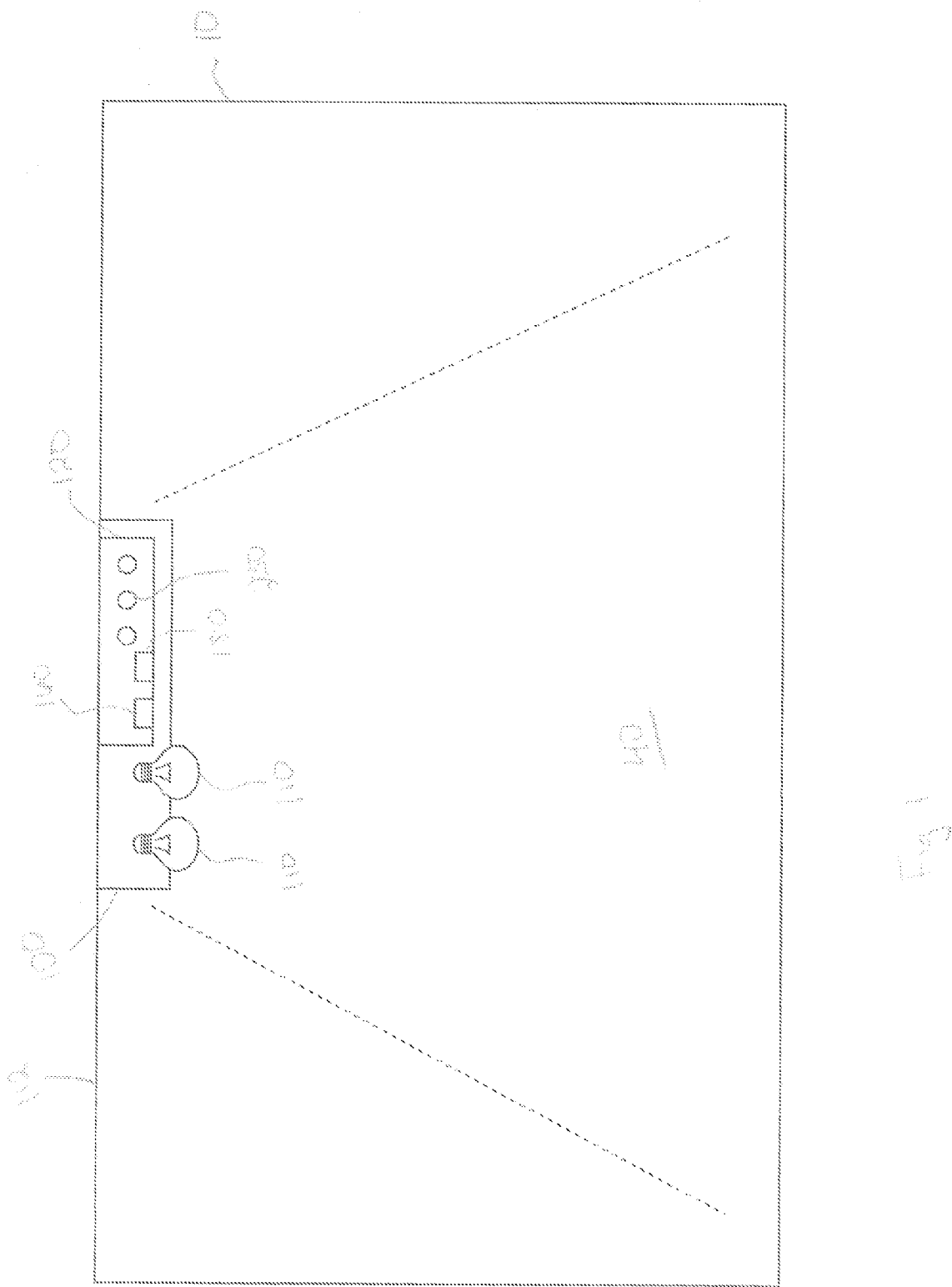
FIG. 1 is a schematic illustration of a room including the lighting assembly.

FIG. 1 schematically shows a portion 10 of a large building and a lighting assembly 100 for that portion 10 The lighting assembly 100 includes one or more groups of lights 110 positioned at or near the ceiling 112 to maximize the illumination of objects in an area 40 below. The lights 110 can be of any known type, for example, fluorescent lights or LED lights.

Figure 2:
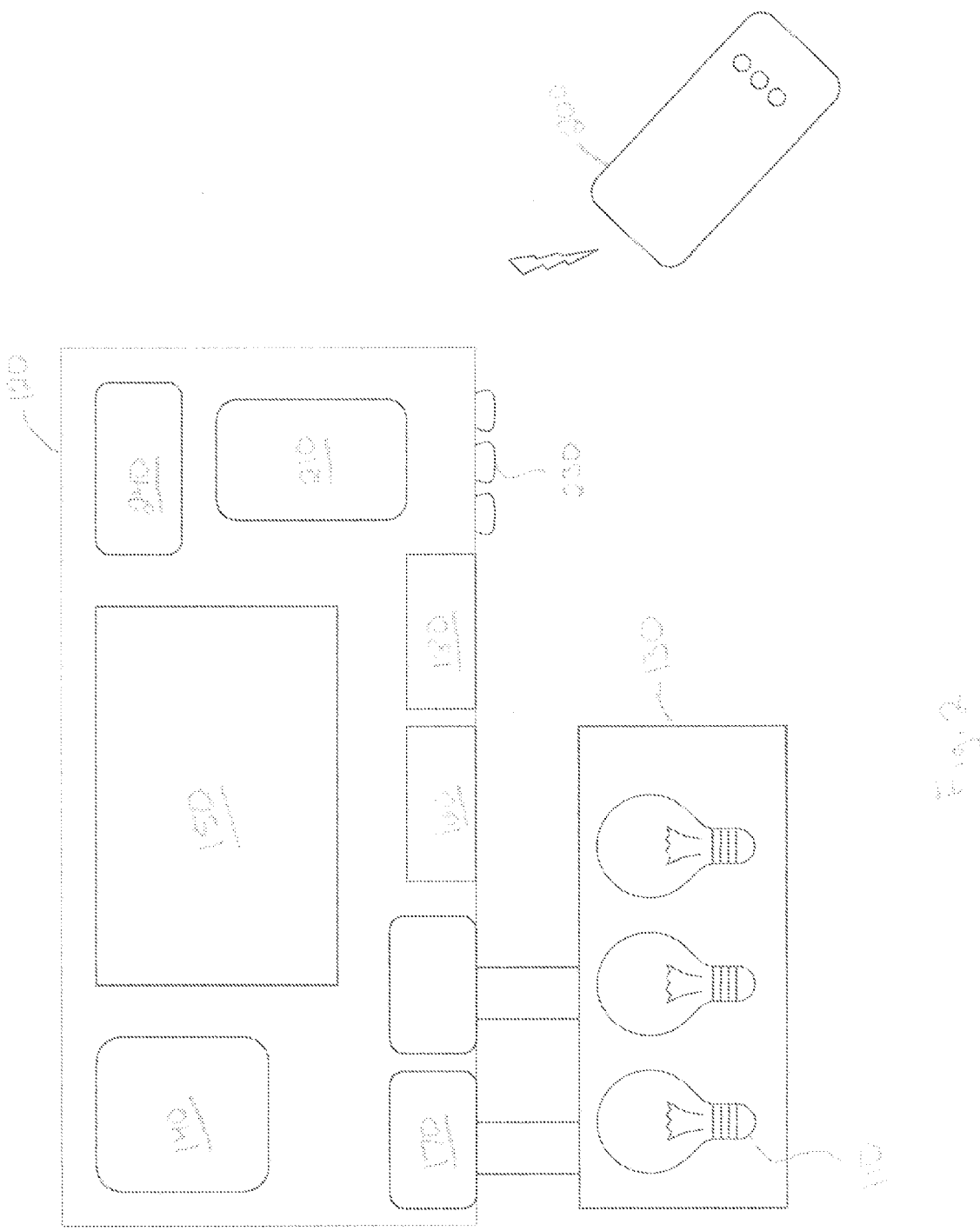
FIG. 2 is a schematic diagram of the layout of the lighting assembly of FIG. 1.

Referring also to FIG. 2, the lights 110 are controlled by a controller 120. As illustrated, the lights 110 are integrated with the controller 120, but in other constructions the controller 120 is spaced apart from the lights 110. The controller 120 includes electrical and electronic components to power and control the lights 110 which, if of the fluorescent type, will include a ballast 130 to regulate the voltage and current supplied to the lights 110. One or more groups of lights 110 for lighting the area 40 can be controlled by the same controller 120.

The controller 120 includes a power supply 140 that receives alternating current (AC) power and transforms the power to direct current (DC) for use within the controller 120. Such power supplies are known to those of skill in the art and need not be further detailed. A microprocessor 150 controls all functions within the controller 120 hereinafter described.

Referring also to FIG. 1, the building portion 10 utilizes motion control to control the activation and duration of the lights 110. A motion detector or sensor 160 is positioned and oriented to detect motion in the area 40. Motion sensors suitable for use with the lighting assembly 100 include those that utilize IR, ultrasonic, electric eye, visual systems (cameras) or a combination thereof to detect motion. One of ordinary skill in the art will recognize that the suitability of any motion detector is dependent on the circumstances of use and, for example, a sensor that uses infrared technology to detect the heat signature of a person entering a space, or that uses a camera to detect motion through frame comparison, may be more suitable for daytime use. As illustrated, the motion sensor is incorporated into the controller 120 but in some constructions, the motion sensor 160 is positioned at another point in the building a distance from the lighting assembly 100 and provides remote signaling back to the controller 120. The controller 120 activates one or more of the groups of lights 110 in response to motion detected in the area 40 by sending a discrete signal to the ballast 130 through a relay output 170.

The controller 120 stores a threshold level of motion that, if not detected by the motion detector 160, will initiate deactivation of the lights 110. To reduce nuisance deactivation, the controller 120 includes an internal timer or other device that measures or calculates the passage of time. If the timer commences due to sub-threshold motion, the lights 110 will remain on for a pre-selected time duration, or interval. As an example, in one construction the lights 110 may stay on for one minute after the motion sensor 160 has stopped detecting the threshold level motion. If within that minute the motion detector 160 detects motion in the area 40, the timer will reset or, alternatively, could incrementally increase by one minute or any other period of time determined by the user. If the timer times out, the relay output 170 will cease sending a signal to the ballast 130.

An ambient light sensor 180 is positioned to detect ambient light in the area 40. The ambient light includes light entering area 40 from all sources, natural and artificial, and is used to adjust the light emitted from the lights 110. In some constructions, the ambient light sensor 180 is positioned at another point in the building a distance from the lighting assembly 100 and provides remote signaling back to the controller 120.

At least two modes of light control are contemplated with the ambient light sensor 180. If the groups of lights 110 to be controlled are stoppable light sources, i.e., the ballast 130 permits either "on" or "off" states of the lights 110, the controller 120 will operate in a first mode. In this mode, if an ambient light level threshold stored in the controller 120 is not met by the detected light level, the controller 120 will output a discrete signal through the relay output 170 to the ballast 130. In one construction, a single signal is sent by the relay output 170 to the ballast 130. For example, if the threshold setpoint for turning on the lights 110 is 100 lux, lighting levels detected by the sensor 180 at or below 100 lux will trigger a signal from the relay output 170. In another construction, the lights 110 can be configured such that one group of lights 110 is powered with a first signal from the relay output 170 and, if the resultant lighting does not meet a second threshold value stored in the controller 120 (as determined by the ambient light sensor 180), an additional group of lights 110 of the assembly 100 is powered with a second discrete signal from the relay output 170. For example, if the ambient light sensor 180 does not detect adequate light levels after the first relay is energized, the controller 120 will output a second discrete signal to the ballast 130 to control the activation of a second group of lights 110. In yet another construction, the first discrete signal from the relay output 170 only partially powers a group of lights 110 (e.g., 50%), and a second discrete signal sent from the relay output 170 in response to insufficient lighting levels fully powers that group of lights 110.

If the group of lights 110 to be controlled are dimmable light sources, i.e., if the ballast 130 is a dimmable ballast or includes dimming functionality for receiving an analog input control signal, the controller 120 will operate in a second mode. In the second mode, if the ambient light level threshold is not met, the controller 120 will generate an analog signal from an analog output 190 to the dimmable ballast 130. The analog signal can be, for example, a 0-20 mA, 4-20 mA, or 0-10 VDC signal. Upon receiving an analog signal, the dimmable ballast 130 adjusts the voltage and current supplied to the lights 110 accordingly. Specifically, if the ambient light sensor 180 detects a level of light below the threshold level set in the controller 120, the analog output 190 provides a signal within the analog range, e.g., 0-10 VDC, to the ballast 130. In this mode of operation, a separate predetermined light intensity level can be set within the controller 120 and the ambient light sensor 180 operated to continually monitor the light level within the area 40. The controller 120 will adjust the analog output signal to maintain a level of light in the area 40 commensurate with the predetermined light intensity level setpoint. A control algorithm, such as PI or PID control, is used for this purpose to reach and maintain the light illumination at or near the light intensity level setpoint. The controller 120 can also measure the ambient light levels received from the sensor 180 during periods when no lights 110 from any groups are activated in order to determine the amount of natural light available in the area 40. For example, where pulse width modulation control is utilized, the sensor 180 can measure the varying light levels between pulses, i.e., the high/low pulses of the ballast 130, to differentiate brightness due to the lights 110 versus brightness from other sources. In some instances, a second sensor 180 is used for this differential detection and positioned such that one sensor 180 is above the assembly 100 and one below the assembly 100.

Motion control and ambient light level control can be implemented separately or together. In some constructions, the controller 120 can control both steppable lights and dimmable lights and is therefore configured to generate both relay and analog outputs. For example, motion control can be used to initially turn on groups of lights 110 that are then controlled with the ambient light sensor 160 while motive activity is ongoing within the area 40.

Figure 3:
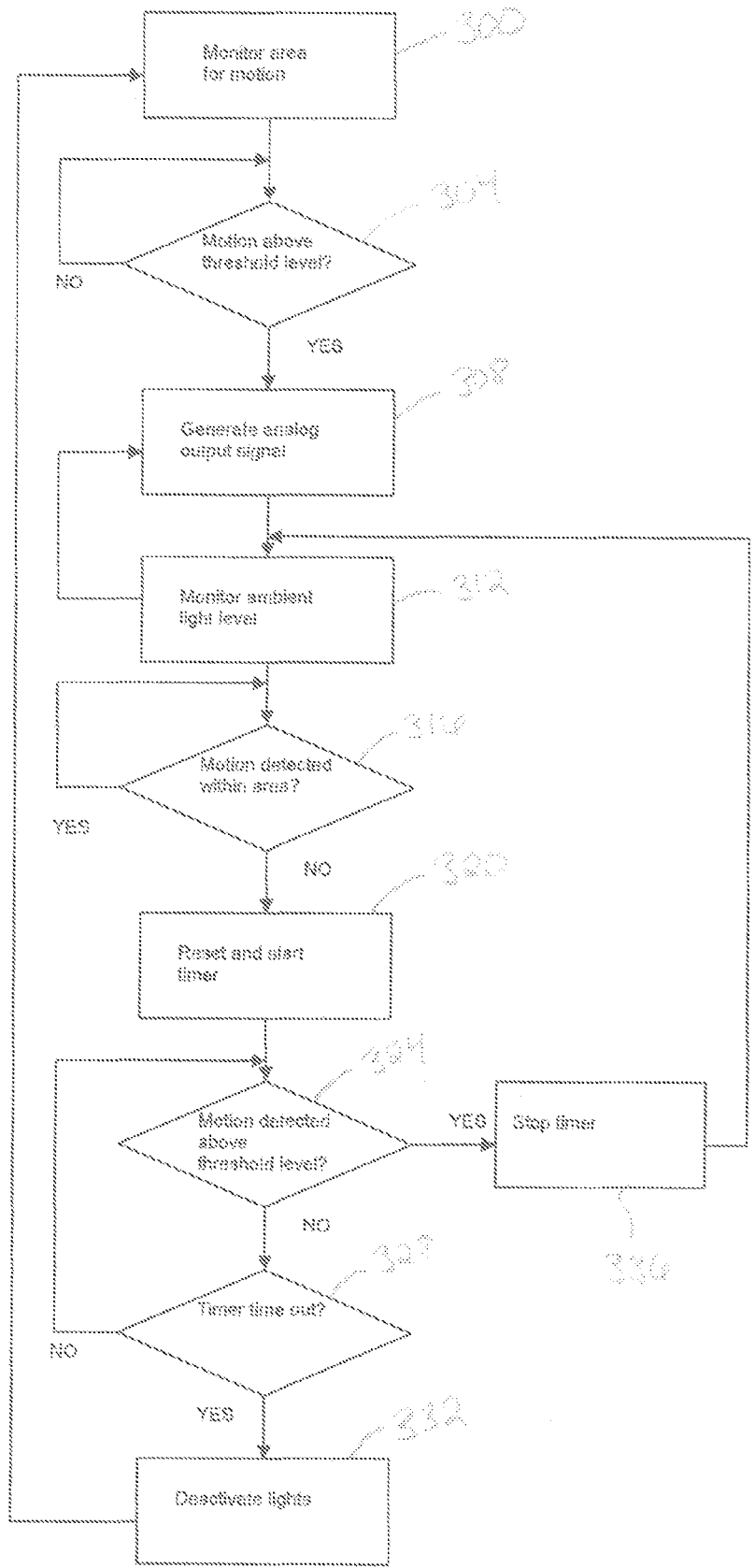
FIG. 3 is a flow chart of a control algorithm for the lighting assembly of FIG. 1.

Referring to FIG. 3, in one embodiment of a control algorithm using both motion control and ambient light level control for dimmable lights, the routine begins at step 300, in which the area 40 is monitored by the motion sensor 160. During this monitoring, the values received from the motion sensor 160 are evaluated within the controller 120. If motion is detected above the threshold level stored in the controller 120 (step 304), then the controller generates a signal from the analog output 190 to the ballast 130 (step 308). In most applications, the analog signal generated will initially be nearer to the low output value, e.g., nearer 0 volts in a 0-10 VDC output range, in order to slowly ramp up the illumination level after the lights 110 have been off. As the light levels in the area 40 are now also monitored by the ambient light sensor 180 (step 312), if the light intensity has not reached the predetermined light intensity level the analog output signal is adjusted until the setpoint is reached.

If motion within the area 40 ceases to be above the threshold level (step 316), the timer within the controller 120 will reset and commence counting time (step 320) for the predetermined time duration, or interval, throughout which the lights 110 will remain on and controlled. If no motion above the threshold level is detected by the sensor 160 during the timing period (step 324) and the timer times out (step 328), the lights 110 will be deactivated (step 332). If motion is detected above the threshold level during the timer interval, however, the controller 120 stops the timer (step 336) and continues with analog output signal control.

The controller 120 stores multiple setpoints to control different lighting parameters, including any and all of the setpoints previously identified, e.g., the threshold level of motion, the time duration or interval for light activation after cessation of motion, the ambient light level threshold, and the light intensity level.

In order to efficiently adjust these setpoints, the controller 120 is responsive to an IR remote control 200 (FIG. 2). The remote control 200 can be activated from a position distant from, but within the line of sight of, the controller 120. When activated by a user, the remote control 200 sends out a signal consisting of a series of infrared pulses. An IR receiver 210 in the controller 120 receives these pulses and accordingly adjusts the appropriate setpoints. For example, a user may decide to increase the sensitivity of the light assembly 100 to motion within the area 40. By depressing the correct series or sequence of buttons on the remote control 200, the user can adjust the motion setpoint within the controller 120 down, i.e., to require less motion to activate the lights 110. The user can similarly adjust the light intensity level setpoint from the remote control 200 to increase or decrease the amount of illumination maintained by the controller 120. The user can also adjust the duration, or time interval, after which the controller 120 will turn off the lights 110 if no motion in the area 40 is detected by the motion sensor 160 and in turn, can adjust the function of the tinier to reset or instead increase the time duration by a fixed amount if motion is detected in the area 40 within the interval. The user can additionally adjust the mode of light control from the remote control 200 to change between the first mode of control and the second mode of control previously identified. Though described using infrared technology, other wireless control systems are possible for the remote control 200.

In some applications, a separate IR transmitter or beacon can be coupled directly to either a person or to material handling equipment, such as a forklift, or be incorporated within the remote control 200. The IR beacon signals the controller 120, through the IR receiver 210, of the presence of the person or equipment. For example, if the IR beacon is located on a forklift that enters the area 40 or is within the line of sight of the controller 120, the controller 120 will automatically activate the lights 110 and commence lighting control as previously described. When the forklift exits the area 40, the controller 120 initiates deactivation of the lights. As the forklift enters and exits additional areas, lights will be activated and deactivated in turn.

The controller 120 also includes an LED display 230 consisting of a plurality of LEDs that provide a visual cue of the current status of the controller 120. Besides confirming the operational condition of the controller 120, to include the various modes of operation, the LED display 230 can show concurrent responsiveness to signals from the remote control 200.

The controller 120 can further include a radio frequency (RE) transceiver 240. The transceiver 240, which has both a transmitter portion and a receiver portion, is able to transmit and receive radio signals and permits communication between similarly configured controllers 120 within other lighting areas of the building. When the motion detector 160 detects motion at the threshold level, the controller 120 activates its associated lights 110 and further signals the transceiver 240 to generate a radio signal at a pre-selected power level. A corresponding RF transceiver 240 at a second controller 120 within the broadcast range of the generated signal receives the transmitted signal and activates additional lights 110 in communication with additional lighting assemblies 100. As a result, motion within the area 40 activates not only the lights 110 for the area 40, but additional lights in surrounding areas. Pre-selection of the surrounding areas is accomplished by changing the power level transmitted by the transceiver 240, which can be adjusted through the remote control 200.

In addition, the transceiver 240 permits communication of operational data of the controller 120 for logging purposes. For example, current setpoints stored within the controller 120 and historical power usage of the lights 110 are transmittable through the transceiver 240 to a receiver incorporated with a computer, where such data can be logged and analyzed. In such a manner, safe, efficient, and economical operation and adjustment of the lighting assembly 100 is achieved.

Thus, the invention provides, among other things, a lighting system. Although the invention has been described in detail with reference to certain preferred constructions, variations and modifications exist within the scope and spirit of one or more independent aspects of the invention as described.

What is claimed is:

1. A lighting system comprising:
a light emitting element operable to emit light at a level between zero and 100 percent;
a light level sensor positioned to detect a total level of light;
a motion detector positioned to detect a motion in a predefined space;
a controller coupled to the light emitting element, the light level sensor, and the motion detector and operable to compare a measured total level of light to a set point and to activate the light emitting element in response to the measured total light level being below the setpoint, the controller further operable to activate the light emitting element in response to the detection of motion within the space;
wherein the controller is operable in a first mode and a second mode;
wherein in the first mode, the controller activates the light emitting elements using a discrete signal;
wherein in the second mode, the controller activates the light emitting elements using an analog signal.

2. The lighting system of claim 1, wherein the light emitting element includes a plurality of fluorescent lights.

3. The lighting system of claim 2, wherein the plurality of fluorescent lights are operable to emit an amount of light between zero and 100 percent.

4. The lighting system of claim 3, wherein each of the fluorescent lights of the plurality of fluorescent lights is operable to emit one of no light or 100 percent of its capacity and wherein a portion of the plurality of fluorescent lights are operated at 100 percent to achieve a level of emitted light from the plurality of fluorescent lights that is below 100 percent.

5. The lighting system of claim 3, wherein each of the fluorescent lights of the plurality of fluorescent lights is operable to emit a level of light between zero and 100 percent such that the level of emitted light from the plurality of fluorescent lights can be set at any point between zero and 100 percent.

6. The lighting system of claim 1, further comprising a remote sensor coupled to the controller, the remote sensor operable to remove a signal indicative of the setpoint, the controller operable to adjust the setpoint in response to receipt of the signal.

7. The lighting system of claim 6, wherein the remote sensor is an infrared (IR) sensor operable to detect an infrared signal.

8. The lighting system of claim 6, wherein the remote sensor is a radio frequency (RF) sensor operable to detect a radio frequency.

9. A method of controlling a light level within a space, the method comprising:
sensing a current light level at a predetermined location;
storing a first desired light level in a controller operable in a first mode and a second mode;
comparing the sensed light level with the first desired light level;
adjusting the light output of a plurality of fluorescent lights in response to the comparison of the sensed light level to the first desired light level until the sensed light level is about equal to the first desired light level;
remotely adjusting the desired light level to a second desired light level; and
adjusting the light output of the plurality of fluorescent lights in response to a comparison of the sensed light level to the second desired light level until the sensed light level is about equal to the second desired light level;
wherein in the first mode, the controller adjusts the light output of the plurality of fluorescent lights using a discrete signal;
wherein in the second mode, the controller adjusts the light output of the plurality of fluorescent lights using an analog signal.

10. The method of claim 9, wherein the adjusting the light output of the plurality of fluorescent lights includes activating a portion of the plurality of fluorescent lights at 100 percent of their light emitting capacity and deactivating the remainder of the plurality of fluorescent lights such that the total amount of light emitted by the plurality of fluorescent lights is less than 100 percent of the total possible amount of light emitted from the plurality of fluorescent lights.

11. The method of claim 9, wherein the adjusting the light output of the plurality of fluorescent lights includes dimming each of the plurality of fluorescent lights such that each light emits light at a level between zero and 100 percent of its capacity and the total amount of light emitted by the plurality of fluorescent lights is between zero and 100 percent of the total capacity.

12. The method of claim 9, wherein the remotely adjusting step includes emitting an infrared signal from a remote transmitter and receiving that signal at an infrared receiver, the infrared receiver communicating with a controller to adjust the desired light level in response to the signal.

13. The method of claim 9, wherein the remotely adjusting step includes emitting a radio-frequency signal from a remote transmitter and receiving that signal at a radio-frequency receiver, the radio-frequency receiver communicating with a controller to adjust the desired light level in response to the signal.

14. The method of claim 9, further comprising detecting motion within a predefined area and activating a portion of the plurality of fluorescent lights in response to the detected motion.

* * * * *